July 5, 1932. A. S. CAMPBELL 1,865,673
HANGING DOORS IN AUTOMOBILE BODIES
Filed Oct. 16, 1928
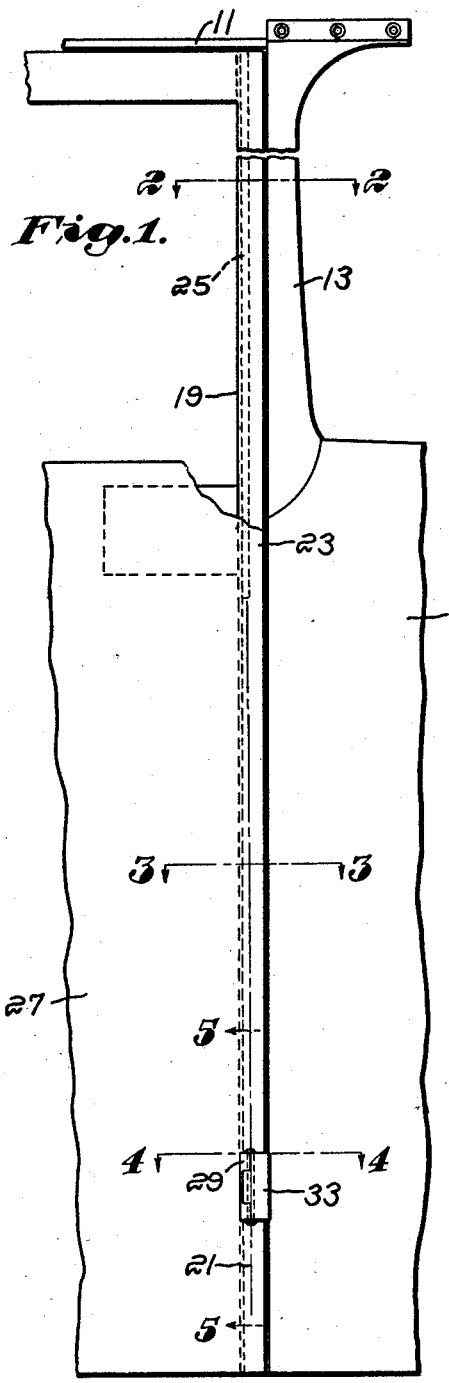
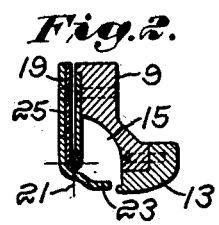
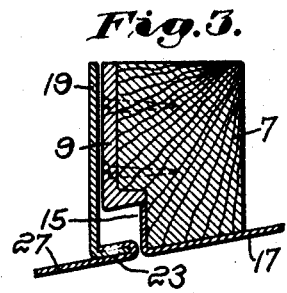
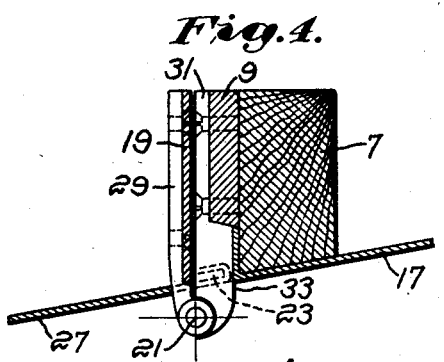
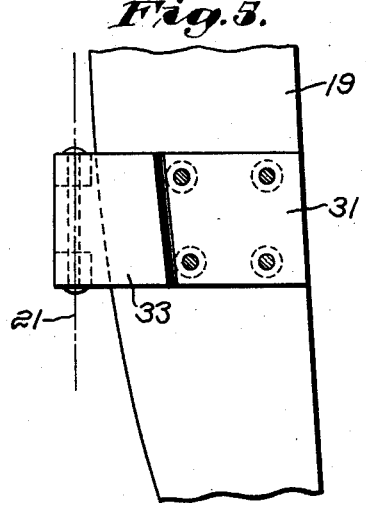
Inventor:
Alphonso S. Campbell
by Emery, Booth, Janney & Varney
Attys.

Patented July 5, 1932

1,865,673

UNITED STATES PATENT OFFICE

ALPHONSO S. CAMPBELL, OF WINCHESTER, MASSACHUSETTS, ASSIGNOR TO A. S. CAMPBELL COMPANY, OF EAST BOSTON, MASSACHUSETTS, A CORPORATION OF MASSACHUSETTS

HANGING DOORS IN AUTOMOBILE BODIES

Application filed October 16, 1928. Serial No. 312,848.

This invention relates to the construction of automobile bodies and more especially to the hanging of the doors thereof, and the object is to provide an improved construction wherein the hinging means for the door is concealed from view in the completed vehicle in the region above the turn-under.

My invention will be well understood by reference to the following description of an illustrative embodiment thereof shown by way of example in the annexed drawing, wherein:

Fig. 1 is a fragmentary broken view of the forward corner of an automobile body of the enclosed type; and Figs. 2, 3, 4 and 5 are sections on the correspondingly numbered lines of Fig. 1. In Figs, 2, 3 and 4 portions of the door structure which are not necessary for an understanding of the invention have been omitted for the sake of simplicity and clearness.

In the drawing I have shown an automobile having a door of the type customary in closed vehicles which is hung from a body hinge pillar which is herein shown as comprising (see Fig. 4) a wooden framing element 7 located at the cowl of the vehicle and extending from the sill to the region of the belt, a dropforged or otherwise suitably formed metallic pillar member 9 secured to the face of this element which opposes the door and which extends to the roof of the vehicle where it is secured by a suitable anchor 11 to the roof framing, not shown. In the embodiment of the invention shown the contour of the upper part of the pillar is competed by a detachably secured member 13 which may conveniently be an aluminum die casting. For purposes which will hereinafter appear, the exterior inner corner of the pillar, that is, the one toward the outer side of the body and towards the door, is provided with a suitable recess 15. As shown in Fig. 3, in the lower portion of the pillar the recess 15 may be defined by the exterior side of the forged member 9 and the inner face of the wooden frame member 7 exterior thereto and the cowl panel 17 may be flanged over and secured to this face of the wooden member which defines one side of the recess.

The door hinge pillar 19 is hung to the body hinge pillar to swing about an axis 21 which in the upper portion of the door is disposed inwardly of the exterior face of the completed body, or (see Fig. 2) inwardly of the exterior side of the recess 15. The pillar 19 is herein shown as of sheet metal construction having a web-like section lying, when the door is closed, parallel to the jamb face of the body hinge pillar and its exterior side is provided with a flange 23 overlying axis 21 and the exterior side of the recess 15, opposing in the region above the belt the exterior and inner corner of the pillar 9 at the forward side of said recess with a suitable paint clearance, as shown in Fig. 2. In the opening movement of the door the flange 23 works in the recess 15, as will be well understood. The hinging means at the upper part of the door is herein shown as provided for by a single hinge 25 of the piano type extending the major portion of the distance between sill and belt as shown in dotted lines in Fig. 1 and having leaves secured respectively to the outer face of the door hinge pillar 19 and the inner or opposed face of the body hinge pillar. The use of a long hinge of this nature as herein shown permits the same to be made of relatively thin stock and organized between the opposed faces of the two pillars without undue bulkiness in the assembly and permits flange 23 to be extended to oppose the opposite surface of the door pillar with a suitable paint clearance without making the recess 15 of undue size. In the construction of the door the exterior panel 27 may be clinched around flange 23, as best seen in Fig. 3. The panel is broken away in Fig. 1 and does not appear in the section of Fig. 2.

Vehicles of the kind under consideration are ordinarily narrower at the sills than at an elevation above the same and the sides are incurved towards the sills forming what is known as the turn-under, graphically shown in Fig. 5. On account of this construction the hinge axis 21 may in the zone of the turn-under fall outward of the side of the vehicle and here it is convenient to utilize a hinge, the pivot of which is exposed as shown in Fig. 1. The hinge may be of the butt type, as herein shown and is conveniently of short height and formed from relatively heavy stock, being comparable in these points with the customary exposed hinges used on automotive vehicles. This hinge (see Fig. 4) may have a leaf 29, herein shown as secured to the inner face of the door pillar 19, and a leaf 31 which may be secured in a suitable mortise in the inner face of the lower portion of the forging 9 constituting a part of the body pillar, which forging is conveniently thickened at the outer side, as shown in Fig. 4, at the location of this mortise to receive the screws. As seen in Fig. 4, the flange 15 is cut away to its outer edge to pass leaf 31 and to permit opening movement of the door about the center line 21, in which movement the edges of this cut-away portion move over the upper and lower edges of the leaf. To fill this opening in the flange and to dissimulate the presence of the recess 15 immediately behind the same, the leaf 31 may be provided with a thickened portion 33 on its outer face adapted to fill this cut-away portion of flange 15 and substantially to fill the recess in alignment with this flange. The break in the flange and the recess behind the same are thus dissimulated and not seen when the door is closed, as in Fig. 1. Preferably, as seen in Fig. 4, this thickened portion extends on the outer side substantially straight towards the exterior for a suitable distance and then sweeps in a smooth curve into tangency with the hinge knuckles at the extreme outer end of the hinge.

In the present description and in the accompanying claims I have attempted to use the words "interior" and "exterior" with reference to the vehicle as a whole, and the words "inner" and "outer" with reference to the door as a structure in itself.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

Claims:

1. A vehicle body having a turn-under, a door therefor having a hinge pillar provided with a flange, hinging means for the door operating about an axis which above the belt lies inwardly of said flange and including a lower hinge in the zone of the turn-under, said flange being cut away to pass said hinge in the opening of the door, the hinge being formed to fill said cut-away portion when the door is closed.

2. In a vehicle body having a turn-under, a body hinge pillar recessed at its inner exterior edge, a door hinge pillar hinged thereto on an axis which lies interiorly of the exterior surface of the pillar in the region above the turn-under and having a flange overlying said axis and adapted to work in the recess of the body pillar in the opening movement of the door, the hinging means for said door including a hinge in the zone of the turn-under having an exteriorly exposed pintle, a leaf secured to the door pillar and a leaf secured to the body pillar and intersecting said flange, said latter leaf having an enlargement which substantially fills said recess in the fore and aft direction.

In testimony whereof, I have signed my name to this specification.

ALPHONSO S. CAMPBELL.